United States Patent [19]

Kishimoto et al.

[11] Patent Number: 4,845,017

[45] Date of Patent: Jul. 4, 1989

[54] METHOD FOR PROCESSING SILVER HALIDE COLOR PHOTOGRAPHIC LIGHT-SENSITIVE MATERIAL

[75] Inventors: Shinzo Kishimoto; Shigeru Ohno, both of Kanagawa, Japan

[73] Assignee: Fuji Photo Film Co., Ltd., Kanagawa, Japan

[21] Appl. No.: 753,514

[22] Filed: Jul. 10, 1985

[30] Foreign Application Priority Data

Jul. 10, 1984 [JP] Japan ............................... 59-142644

[51] Int. Cl.[4] .......................... C03C 7/00; C03C 7/42

[52] U.S. Cl. .................................... 430/393; 430/430; 430/460; 430/461

[58] Field of Search ................ 430/393, 430, 460, 461

[56] References Cited

U.S. PATENT DOCUMENTS

| | | | |
|---|---|---|---|
| 4,144,068 | 3/1979 | Ishibashi et al. | 430/393 |
| 4,163,669 | 8/1979 | Kanada et al. | 430/393 |
| 4,508,816 | 4/1985 | Yamamuro et al. | 430/430 |
| 4,546,070 | 10/1985 | Kishimoto et al. | 430/393 |
| 4,756,918 | 7/1988 | Ueda et al. | 430/393 |
| 4,762,774 | 8/1988 | Kishimoto et al. | 430/393 |

*Primary Examiner*—Richard L. Schilling
*Assistant Examiner*—Janet C. Baxter
*Attorney, Agent, or Firm*—Sughrue, Mion, Zinn, Macpeak & Seas

[57] ABSTRACT

A method for processing a silver halide color photographic light-sensitive material by subjecting an exposed silver halide color photographic light-sensitive material to color development, then to bleaching and fixing or then to bleach-fixing, which method comprises using a ferric ion complex salt as a bleaching agent in the bleaching or bleach-fixing and incorporating at least one compound represented by general formula (I) described below or a salt thereof:

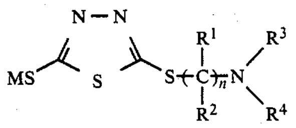

(I)

wherein $R^1$ and $R^2$ each represents a hydrogen atom, a hydroxy group, a substituted or unsubstituted amino group, a carboxy group, a sulfo group or a substituted or unsubstituted alkyl group; $R^3$ and $R^4$ each represents a hydrogen atom, a substituted or unsubstituted alkyl group or a substituted or unsubstituted acyl group or $R^3$ and $R^4$ may be bonded to each other to form a ring; M represents a hydrogen atom, an alkali metal atom or an ammonium group; and n represents an integer of 2 to 5 in a bleaching bath or bleach-fixing bath or in a prebath of the bleaching bath or bleach-fixing bath.

The method of the present invention does not produce poisonous materials which are harmful to the environment and provides an excellent high speed bleaching process without harming other photographic properties.

19 Claims, No Drawings

METHOD FOR PROCESSING SILVER HALIDE COLOR PHOTOGRAPHIC LIGHT-SENSITIVE MATERIAL

FIELD OF THE INVENTION

The present invention relates to a method for processing an exposed silver halide color photographic light-sensitive material (hereinafter referred to as a color light-sensitive material) which comprises developing, bleaching, and fixing (hereinafter referred to as a color photographic processing method), and, more particularly, to an improved bleaching process which accelerates the bleaching function, thus shortening the processing time while providing sufficient bleaching, thus providing a color photographic image of good image quality.

BACKGROUND OF THE INVENTION

The fundamental steps of processing color light-sensitive materials generally include a color developing step and a desilvering step. Thus, an exposed color light-sensitive material is introduced into a color developing step, where silver halide is reduced with a color developing agent to produce silver and the oxidation product of color developing agent in turn reacts with coupler to yield a dye image. Subsequently, the color light-sensitive material is introduced into a desilvering step, where silver produced in the preceding step is oxidized with an oxidizing agent (usually called a bleaching agent), and dissolved away with a silver ion complexing agent usually called a fixing agent. Therefore, only a dye image is formed in the thus processed color light-sensitive material. In addition to the above described two fundamental steps of color development and desilveration, actual development processing involves auxiliary steps for maintaining the photographic and physical quality of the resulting image or for improving the preservability of the image. For example, there are illustrated a hardening bath for preventing a light-sensitive layer from being excessively softened during color photographic processing, a stopping bath for effectively stopping the developing reaction, an image stabilizing bath for stabilizing the image, and a layer removing bath for removing the backing layer on the support.

The above described desilvering step may be conducted in two ways: one way used two steps employing a bleaching bath and a fixing bath; and the other way is more simple and is conducted in one step employing a bleach-fixing bath containing both a bleaching agent and a fixing agent for the purpose of accelerating the processing and labor elimination.

Ferricyanide and ferric chloride, heretofore used as bleaching agents, are good bleaching agents due to their high oxidizing power. However, a bleaching solution or bleach-fixing solution containing ferricyanide as a bleaching agent can release poisonous cyanide by photolysis causing environmental pollution. Accordingly, waste processing solutions thereof must be rendered harmless in view of environmental pollution. A bleaching solution containing ferric chloride as a bleaching agent is not desirable because materials of vessels in which the solution is retained are liable to be corroded due to the extremely low pH and high oxidizing power of the solution. In addition, iron hydroxide is precipitated in an emulsion layer during a water-washing step after a bleaching step using ferric chloride, resulting in staining.

On the other hand, potassium dichromate, quinones, copper salts, etc., which have been used as bleaching agents have weak oxidizing power and are difficult to handle.

In recent years, bleach processing using a ferric ion complex salt (e.g., aminopolycarboxylic acid-ferric ion complex salt, particularly iron (III) ethylenediaminetetraacetate complex salt) as a major bleaching bath component has mainly been employed in processing color light-sensitive materials in view of the acceleration and simplification of the bleaching provided and the need to prevent environmental pollution.

However, ferric ion complex salts have a comparatively low oxidizing power and, therefore, have insufficient bleaching power. A bleaching or bleach-fixing solution containing such a complex salt as a bleaching agent can attain some desirable objects when bleaching or bleach-fixing a low speed color light-sensitive material containing, for example, a silver chlorobromide emulsion as a major component. However, such a solution fails to fully desilver due to insufficient bleaching power or requires a long time to bleach when processing a high speed, spectrally sensitized color light-sensitive material containing a silver chlorobromoiodide emulsion or a silver iodobromide emulsion as a major component, particularly color reversal light-sensitive materials for photographing or color negative light-sensitive materials for photographing comprising an emulsion containing a larger amount of silver.

Other known bleaching agents than ferric ion complex salts include persulfates. Persulfates are usually used in a bleaching solution together with a chloride. However, this persulfate-containing bleaching solution has less bleaching ability than ferric ion complex salts, thus requiring a substantially long period of time for bleaching.

As described above, bleaching agents which do not cause environmental pollution or corrode vessels and apparatus have only a weak bleaching ability. Hence, it is requested to enhance the bleaching ability of a bleaching solution or a bleach-fixing solution containing a weak bleaching agent, particularly a ferric ion complex salt.

In order to raise the bleaching ability of a bleaching solution or a bleach-fixing solution containing a ferric ion complex salt such as iron (III) ethylenediaminetetraacetate as a bleaching agent, it has been proposed to add various bleach accelerating agents to the processing bath.

Examples of such bleach accelerating agents include 5-membered heterocyclic mercapto compounds as described in British Pat. No. 1,138,842, thiadiazole derivatives as described in Swiss Pat. No. 336,257, thiourea derivatives, and thiazole derivatives, etc. However, these compounds do not necessarily have sufficient bleach accelerating effects when they are added to a bleaching solution or a prebath thereof. Also, only insufficient bleach accelerating effects are obtained when they are added to a bleach-fixing solution or a prebath thereof. Further, in the latter case they react with silver ions present in the bleach-fixing solution to form precipitate which creates many troubles. For example, the precipitate chokes up filters of a circulation system in an automatic processing machine and it adheres on color light-sensitive materials, resulting in stain formation.

A processing method is also known wherein a 5-membered heterocyclic compound containing two or three nitrogen atoms as ring constituting members and having at least one mercapto group is added to a bath just before a bath of the bleaching processing as described in Japanese Patent Application (OPI) No. 52534/79. However, when these compounds are directly added to a bleaching solution or a bleach-fixing solution, sufficient bleach accelerating effects cannot be obtained. In addition, they lack stability in the processing solution and cannot endure use for a long period of time.

Moreover, thiourea derivatives as described in Japanese Patent Publication No. 8506/70 (corresponding to British Pat. No. 1,150,466) and U.S. Pat. No. 3,706,561, and selenourea derivatives as described in Japanese Patent Application (OPI) No. 280/71 (corresponding to U.S. Pat. No. 3,701,662) are known as bleach accelerating agents. However, many of these bleach accelerating agents do not always show a satisfactory bleach accelerating effect, or some of them lack stability in the processing solution although they have a good bleach accelerating effect. Therefore, they provide a processing solution having only a short effective life or which cannot be stored for a long time.

Furthermore, heterocyclic alkylmercaptan derivatives as described in Japanese Patent Application (OPI) No. 32736/ 78, and aminoalkylmercaptan derivatives as described in U.S. Pat. No. 3,893,858 are known as bleach accelerating agents. However, these bleach accelerating agents do not always show a satisfactory bleach accelerating effect, or they retard fixing even although they can accelerate bleaching. Therefore, a long period of time is necessary for desilvering processing.

In addition, mercaptothiadiazole derivatives having at least one group selected from a carboxy group and a sulfo group as described in Japanese Patent Application (OPI) No. 28426/78 are known as bleach accelerating agents. However, these compounds do not always show a satisfactory bleach accelerating effect in order to carry out desilvering processing for a shorter period of time.

SUMMARY OF THE INVENTION

An object of the present invention is to provide a method for processing a color light-sensitive material, which does not release extremely poisonous materials, which meets the requirement of preventing environmental pollution and which has excellent bleaching speed.

Another object of the present invention is to provide a method involving a bleaching or bleach-fixing step in which enhanced bleaching ability is attained without deteriorating other photographic properties using a bleaching agent having a weak bleaching ability, in particular a ferric ion complex salt.

A further object of the present invention is to provide a bleaching process which uses a bleaching or bleach-fixing solution showing increased bleaching speed and having good stability.

A still further object of the present invention is to provide a method which can rapidly bleach or bleach-fix a color light-sensitive material having a photographing speed.

Other objects of the present invention will become apparent from the following description and examples.

These objects of the present invention are obtained by a method for processing a silver halide color photographic light-sensitive material by subjecting an exposed silver halide color photographic light-sensitive material to color development, then to bleaching and fixing or then to bleach-fixing, which method comprises using a ferric ion complex salt as a bleaching agent in the bleaching or bleach-fixing and incorporating at least one compound represented by general formula (I) described below or a salt thereof:

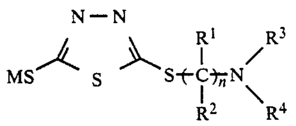

(I)

wherein $R^1$ and $R^2$ each represents a hydrogen atom, a hydroxy group, a substituted or unsubstituted amino group, a carboxy group, a sulfo group or a substituted or unsubstituted alkyl group; $R^3$ and $R^4$ each represents a hydrogen atom, a substituted or unsubstituted alkyl group or a substituted or unsubstituted acyl group or $R^3$ and $R^4$ may be bonded to each other to form a ring; M represents a hydrogen atom, an alkali metal atom or an ammonium group; and n represents an integer of 2 to 5 in a bleaching bath or bleach-fixing bath or in a prebath of the bleaching bath or bleach-fixing bath.

DETAILED DESCRIPTION OF THE INVENTION

The compounds represented by the general formula (I) are described in more detail below.

In the general formula (I), example of the substituted or unsubstituted amino group represented by $R^1$ or $R^2$ include an unsubstituted amino group, a dimethylamino group, a diethylamino group, a methylamino group, etc.

Examples of the alkali metal atom represented by M include a sodium atom, a potassium atom, etc.

The substituted or unsubstituted alkyl group represented by $R^1$, $R^2$, $R^3$ or $R^4$ is preferably a substituted or unsubstituted alkyl group having from 1 to 5 carbon atoms in the alkyl moiety (for example, a methyl group, an ethyl group, a propyl group, etc.). Examples of substituents for the substituted alkyl group include a carboxy group, a hydroxy group, a sulfo group, an amino group (for example, an unsubstituted amino group, a dimethylamino group, etc.), an alkoxy group (for example, a methoxy group, an ethoxy group, etc.), a sulfonyl group (for example, a methanesulfonyl group, an ethanesulfonyl group, etc.), a carbamoyl group (for example, an unsubstituted carbamoyl group, a methyl carbamoyl group, etc.), a sulfamoyl group (for example, an unsubstituted sulfamoyl group, a methylsulfamoyl group, etc.), an amido group (for example, an acetylamino group, etc.), a sulfonamido group (for example, a methanesulfonylamino group, etc.), an alkoxycarbonyl group (for example, a methoxy carbonyl group, an ethoxycarbonyl group, etc.), a carbonyloxy group (for example, an acetyloxy group, etc.), a cyano group or a halogen atom (for example, a chlorine atom, a bromine atom, etc.), etc.

The acyl group represented by $R^3$ or $R^4$ is preferably an acyl group having 3 or less carbon atoms (for example, an acetyl group, etc.).

The ring formed by bonding $R^3$ and $R^4$ includes a pyrrole ring, an imidazole ring, a morpholine ring, a piperidine ring, etc.

Preferred compounds which can be used in the present invention are those represented by the general formula (I) wherein the alkyl group represented by $R^3$ or $R^4$ is an alkyl group substituted with a carboxy group, a hydroxy group, an amino group or a sulfo group.

Specific examples of the compounds represented by the general formula (I) are set forth below, but the present invention should not be construed as being limited thereto.

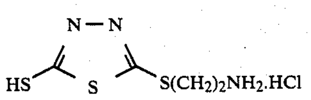
(1)

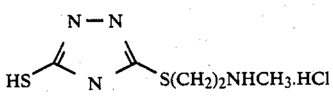
(2)

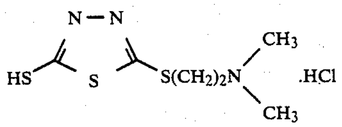
(3)

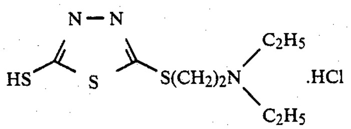
(4)

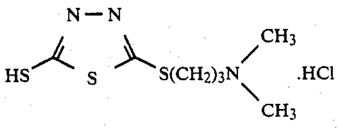
(5)

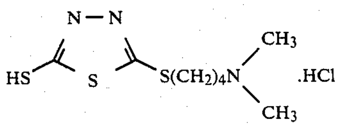
(6)

-continued

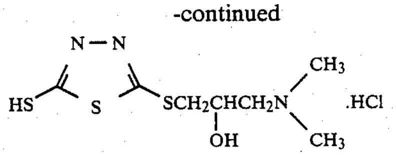
(7)

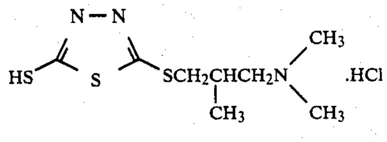
(8)

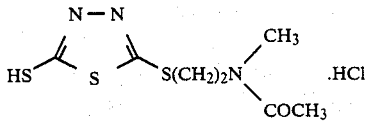
(9)

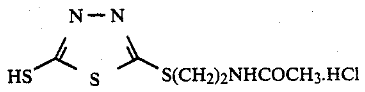
(10)

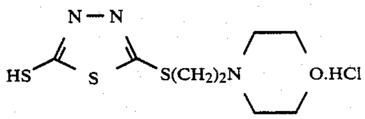
(11)

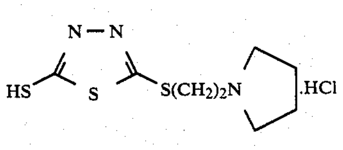
(12)

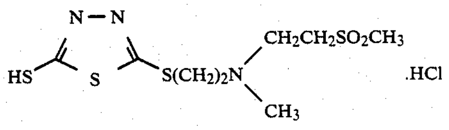
(13)

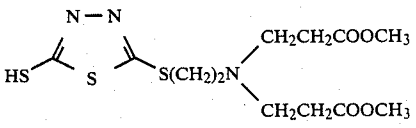
(14)

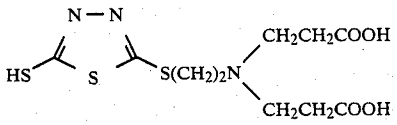
(15)

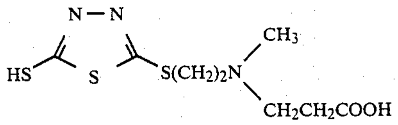
(16)

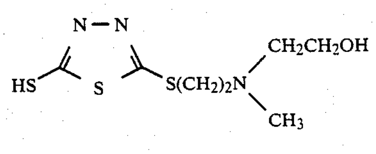
(17)

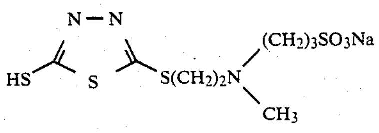
(18)

-continued

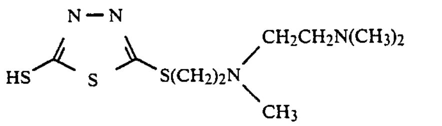
(19)

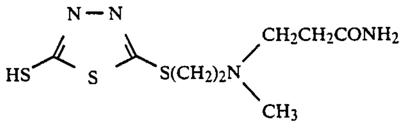
(20)

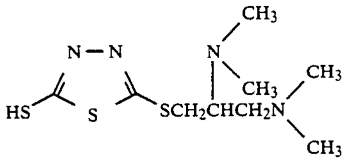
(21)

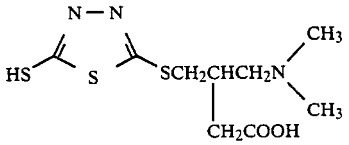
(22)

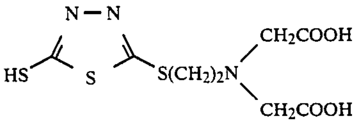
(23)

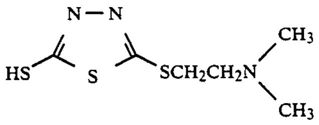
(24)

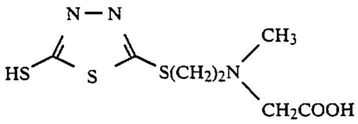
(25)

Preferred examples of the compounds represented by the general formula (I) are (15), (16), (17), (18), (23) and (25).

The compounds represented by the general formula (I) used in the present invention can be easily synthesized by alkylation of 2,5-dimercapto-1,3,4-thiadiazoles with reference to the method as described in *Advanced in Heterocyclic Chemistry*, Vol. 9, pages 165 to 209 (1968).

Typical synthesis examples are set forth below.

SYNTHESIS EXAMPLE 1

Synthesis of Compound (1)

7.5 g of 2,5-dimercapto-1,3,4-thiadiazole, 5.8 g of 2-aminoethyl chloride hydrochloride and 4 g of pyridine were added to 60 ml of n-butanol and the mixture was refluxed by heating for 2 hours. The reaction solution was cooled with ice and the crystals thus-precipitated were collected by filtration and recrystallized from a mixture of methanol and water to obtain the desired compound. Yield: 7.1 g. Melting Point: 228° to 229° C. (dec.).

SYNTHESIS EXAMPLE 2

Synthesis of Compound (3)

7.5 g of 2,5-dimercapto-1,3,4-thiadiazole, 7.3 g of 2-dimethylaminoethyl chloride hydrochloride and 4 g of pyridine were added to 60 ml of n-butanol and the mixture was refluxed by heating for 2 hours. The reaction solution was cooled with ice and the crystals thus-precipitated were collected by filtration and recrystallized from ethanol to obtain the desired compound. Yield: 7.9 g. Melting Point: 161° to 163° C.

SYNTHESIS EXAMPLE 3

Synthesis of Compound (4)

7.5 g of 2,5-dimercapto-1,3,4-thiadiazole, 8.6 g of 2-diethylaminoethyl chloride hydrochloride and 4 g of pyridine were added to 60 ml of n-butanol and the mixture was refluxed by heating for 2 hours. The reaction solution was cooled with ice and the crystals thus-precipitated were collected by filtration and recrystallized from a mixture of ethanol and water to obtain the desired compound. Yield: 10.1 g. Melting Point: 184° to 186° C.

SYNTHESIS EXAMPLE 4

Synthesis of Compound (5)

7.5 g of 2,5-dimercapto-1,3,4-thiadiazole, 7.9 g of 3-dimethylaminopropyl chloride hydrochloride and 4 g of pyridine were added to 60 ml of n-butanol and the mixture was refluxed by heating for 2 hours. The reaction solution was cooled with ice and the crystals thus-precipitated were collected by filtration and recrystallized from ethanol. Yield: 11 g. Melting Point: 149° to 152° C.

SYNTHESIS EXAMPLE 5

Synthesis of Compounds (14) and (15)

Step (1): Synthesis of 2-[N,N-bis(2-methoxycarbonylethyl)-amino]ethyl chloride hydrochloride 6.1 g of 2-aminoethanol was added to 75 ml of methanol and to the mixture was added dropwise 20 ml of methyl acrylate under cooling with ice. Then the mixture was stirred for 2 hours while cooling with ice and further stirred for 20 hours at room temperature. The reaction solution was concentrated under a reduced pressure and to 23 g of the resulting oil was added 100 ml of chloroform. 8.7 ml of thionyl chloride was added to the mixture while cooling with ice and the mixture was refluxed by heating for 1 hour. The reaction mixture was concentrated under a reduced pressure and the residue thus-obtained was recrystallized from a mixture of isopropanol and n-hexane. Yield: 21 g. Melting Point: 103° to 104° C.

Step (2): synthesis of Compound (14)

7.5 g of 2,5-dimercapto-1,3,4-thiadiazole, 14.4 g of 2-[N,N-bis(2-methoxycarbonylethyl)amino]ethyl chloride hydrochloride and 8.1 g of pyridine were added to 80 ml of dioxane and the mixture was refluxed by heating for 2 hours. The reaction mixture was concentrated under a reduced pressure and the residue thus-obtained was purified by column chromatography (stationary phase: alumina; developing solvent: methanol/ethyl acetate) to obtain Compound (14) as sirup. Yield: 8.4 g.

Step (3): Synthesis of Compound (15)

7.3 g of Compound (14) was added to 20 ml of a 20% aqueous solution of sodium hydroxide and the mixture was stirred at 50° C. for 2 hours. The reaction solution was neutralized with 35% hydrochloric acid while cooling with ice and the precipitates thus-formed were collected by filtration and recrystallized from a mixture of dimethylformamide and ethanol to obtain Compound (15). Yield: 3.2 g. Melting Point: 188° to 189° C.

The compound represented by the general formula (I) used in the present invention as a bleach accelerating agent can be incorporated only into either a bleaching bath, a bleach-fixing bath or a prebath thereof. Alternatively, the compound can be incorporated into both a bleaching bath or a bleach-fixing bath and a prebath thereof.

The amount of the compound according to the present invention added to these solutions varies depending upon the kind of processing solution, kind of color light-sensitive material to be processed, processing temperature, time necessary for conducting intended processing, etc. However, an amount of $1\times10^{-5}$ to 1 mol per liter of a processing solution is suitable, with $1\times10^{-4}$ to $1\times10^{1}$ mol being preferable. In general, however, when the amount added is small, there results a small bleach accelerating effect, whereas when the amount is more than is necessary, a precipitate may be formed which stains processed materials. Therefore, the best range is properly determined with consideration for individual cases.

The compound according to the present invention is generally added to a processing solution by previously dissolving it in water, an alkali, an organic acid, or the like. If necessary, an organic solvent such as methanol, ethanol, ethylene glycol, diethylene glycol, etc. may be used for dissolving the compound without adversely affecting its bleach accelerating effect.

When incorporating the compound according to the present invention into a prebath of a bleaching solution or a bleach-fixing solution, the prebath may have various compositions. A prebath having the simplest composition is an aqueous solution prepared by merely dissolving the compound according to the present invention in water. Aqueous solution properly containing acids such as acetic acid, boric acid, etc., alkalis such as sodium hydroxide, etc., or salts such as sodium sulfite, sodium acetate, sodium thiosulfate, sodium borate, sodium carbonate, sodium bicarbonate, etc., are also usable as prebaths with advantage. Prebaths having any pH may be used with satisfactory effects in the present invention. However, too high of a pH may generate stain, and hence prebaths having a pH of 9 or less are generally preferable. The prebath may further contain, if necessary, precipitation preventing agents comprising various chelate compounds; hardeners comprising various compounds including alums or aldehydes; pH buffers; fixing agents for halides; antioxidants such as sulfites, hydroxylamine, hydrazine, etc.; swelling preventing agents such as sodium sulfate, magnesium sulfate, etc.; surfactants; and the like.

Between the prebath and the bleaching bath or the bleach-fixing bath may be provided, for example, a water-washing step, stopping step, stop-fixing step, or the like. In such cases, the addition of the compound according to the present invention to the prebath will also bring about the same bleach accelerating effect. However, where the compound according to the present invention is incorporated only in the prebath, the prebath is preferably provided immediately before a bleaching bath or a bleach-fixing bath.

In the bleaching solution or bleach-fixing solution of the present invention, a bleaching agent having a weak-bleaching ability is used. A ferric ion complex, one of the bleaching agents, is a complex of ferric ion and a chelating agent such as an aminopolycarboxylic acid, an aminopolyphosphonic acid or the salt thereof. Aminopolycarboxylic acid salts or aminopolyphosphonic acid salts are alkali metal salts, ammonium salts or water-soluble amine salts of aminopolycarboxylic acids or aminopolyphosphonic acids. The alkali metals include sodium, potassium, lithium, etc., and water-soluble amines include alkylamines (e.g., methylamine, diethylamine, triethylamine, butylamine, etc.), alicyclic amines (e.g., cyclohexylamine), arylamines (e.g., aniline, m-toluidine, etc.), and heterocyclic amines (e.g., pyridine, morpholine, piperidine, etc.).

Typical examples of these chelating agents, i.e., aminopolycarboxylic acids, aminopolyphosphonic acids, and the salts thereof are:

Ethylenediaminetetraacetic acid;
Disodium ethylenediaminetetraacetate;
Diammonium ethylenediaminetetraacetate;
Tetra(trimethylammonium) ethylenediaminetetraacetate;
Tetrapotassium ethylenediaminetetraacetate;
Tetrasodium ethylenediaminetetraacetate;
Trisodium ethylenediaminetetraacetate;
Diethylenetriaminepentaacetic acid;
Pentasodium diethylenetriaminepentaacetate;
Ethylenediamine-N-(β-oxyethyl)-N,N',N'-triacetic acid;
Trisodium ethylenediamine-N-(β-oxyethyl)-N,N', N'-triacetate;
Triammonium ethylenediamine-N-(β-oxyethyl)-N,N', N'-triacetate;
Propylenediaminetetraacetic acid;
Disodium propylenediaminetetraacetate;
Nitrilotriacetic acid;
Trisodium nitrilotriacetate;
Cyclohexanediaminetetraacetic acid;
Disodium cyclohexanediaminetetraacetate;
Iminodiacetic acid;
Dihydroxyethylglycine;
Ethyl ether diaminetetraacetic acid;
Glycol ether diaminetetraacetic acid;
Ethylenediaminetetrapropionic acid;
Phenylenediaminetetraacetic acid;
1,3-Diaminopropanol-N,N,N',N'-tetramethylenephosphonic acid;
Ethylenediamine-N,N,N',N'-tetramethylenephosphonic acid;

1,3-Propylenediamine-N,N,N', N'-tetramethylenephosphonic acid; etc.

The present invention is not limited to the above illustrated chelating agents.

The ferric ion complex salts may be used in the form of a complex salt per se or may be formed in situ in solution by using a ferric salt (e.g., ferric sulfate, ferric chloride, ferric nitrate, ferric ammonium sulfate or ferric phosphate, etc.) and a chelating agent (e.g., aminopolycarboxylic acid, aminopolyphosphonic acid or phosphonocarboxylic acid, etc.). When they are used in the form of a complex salt, they may be used alone or as a combination of two or more. On the other hand, where a complex is formed in situ in solution by using a ferric salt and a chelating agent, one, two or more ferric salts may be used. Further, one, two or more chelating agents may also be used. In every case, a chelating agent may be used in an excess amount of being necessary for forming a ferric ion complex salt.

A bleaching solution or a bleach-fixing solution containing the above-described ferric ion complex may further contain complexes of metals other than iron such as cobalt or copper or hydrogen peroxide.

The bleach accelerating agents according to the present invention are, of course, effective for the persulfates, but show particularly remarkable effects on ferric ion complex salts.

The bleaching solution used in the present invention can contain re-halogenating agents such as bromides (e.g., potassium bromide, sodium bromide, ammonium bromide, etc.), chlorides (e.g., potassium chloride, sodium chloride, ammonium chloride, etc.), and the like in addition to the bleaching agents such as ferric ion complex salts, etc., and the above described compounds. Further, additives which have a pH buffering ability such as inorganic acids, organic acids, or the salts thereof which are known to be used in ordinary bleaching solutions (e.g., boric acid, borax, sodium metaborate, acetic acid, sodium acetate, sodium carbonate, potassium carbonate, phosphorous acid, phosphoric acid, sodium phosphate, citric acid, sodium citrate, tartaric acid, etc.) may be added.

The amount of bleaching agent is from 0.1 to 2 mols per liter of the bleaching solution, and the pH of the bleaching solution is desirably from 3.0 to 8.0 particularly from 4.0 to 7.0, when a ferric ion complex salt is used.

On the other hand, when the compound according to the present invention is employed in a bleach-fixing solution, ordinary fixing agents, i.e., water-soluble silver halide solvents such as thiosulfates (e.g., sodium thiosulfate, ammonium thiosulfate, ammonium sodium thiosulfate, potassium thiosulfate, etc.); thiocyanates (e.g., sodium thiocyanate, ammonium thiocyanate, potassium thiocyanate, etc.); thioether compounds (e.g., ethylenebisthioglycolic acid, 3,6-dithia-1,8-octanediol, etc.); and thioureas may be used alone or as a combination of two or more. In addition, special bleach-fixing solution comprising a combination of fixing agent and a large amount of a halide compound such as potassium iodide as described in Japanese Patent Application (OPI) No. 155354/80 can be used as well.

In the bleach-fixing composition, it is desirable that the ferric ion complex salt is present in an amount of 0.1 to 2 mols and the amount of fixing agent is from 0.2 to 4 mols, per liter of the bleach-fixing solution.

A bleach-fixing solution can contain the aforesaid additives to be added to the bleaching solution and preservatives such as sulfites (e.g., sodium sulfite, potassium sulfite, ammonium sulfite, etc.), hydroxylamine, hydrazine, aldehyde-bisulfite adducts (e.g., acetaldehyde-sodium bisulfite adduct), etc. Further, various brightening agents, defoaming agents, surfactants, organic solvents (e.g., methanol), and known bleach-fixing accelerating agents (e.g., polyamine compounds as described in Japanese Patent Publication No. 8836/70 (corresponding to U.S. Pat. No. 3,578,454), thiourea derivatives as described in Japanese Patent Publication No. 8506/70 (corresponding to British Pat. No. 1,150,466), iodides as described in West German Pat. No. 1,127,715, polyethylene oxides as described in West German Pat. No. 966,410, nitrogen-containing heterocyclic compounds as described in West German Pat. No. 1,290,812, and other thioureas) may be used. The pH of the bleach-fixing solution upon use is usually from 4.0 to 9.0, particularly preferably from 5.0 to 8.0.

The above described bleaching agent or bleaching agent composition can be a bleaching solution for use as is or for use as a replenisher solution and as a preparation for manufacturing a bleaching solution. When two or more liquid preparations are used, the pH of the liquid preparation containing a ferric ion complex salt can be further increased irrespective of the pH range as described above.

Primary aromatic amine color developing agents to be used in the present invention in a color developing solution include a wide range of known developing agents for use in various color photographic processes. The developing agents include aminophenol derivatives and p-phenylenediamine derivatives. These compounds are generally used in the form of salts such as hydrochlorides or sulfates rather than in free form in view of stability advantages. They are generally used in an amount of from about 0.1 g to about 30 g, more preferably from about 1 g to about 15 g, per liter of color developing solution.

The aminophenol type developing agents include, for example, o-aminophenol, p-aminophenol, 5-amino-2-hydroxytoluene, 2-amino-3-hydroxytoluene, 2-hydroxy-3-amino-1,4-dimethylbenzene, etc.

Particularly useful aromatic primary amine type color developing agents are N,N-dialkyl-p-phenylenediamine compounds where the alkyl group and the phenyl group may or may not be substituted. Of these, particularly useful compounds are N,N-diethyl-p-phenylenediamine hydrochloride, N-methyl-p-phenylenediamine hydrochloride, N,N-dimethyl-p-phenylenediamine hydrochloride, 2-amino-5-(N-ethyl-N-dodecylamino)toluene, N-ethyl-N-β-methanesulfonamidoethyl-3-methyl-4-aminoaniline sulfate, N-ethyl-N-β-hydroxyethylaminoaniline, 4-amino-3-methyl-N,N-diethylaniline, 4-amino-N-(2-methoxyethyl)-N-ethyl-3-methylaniline p-toluenesulfonate, etc.

The alkaline color developing solution used in the present invention can optionally contain, in addition to the above described aromatic primary amine color developing agent, various ingredients usually added to a color developing solution, such as alkali agents (e.g., sodium hydroxide, sodium carbonate, potassium carbonate, etc.), alkali metal sulfites, alkali metal bisulfites, alkali metal thiocyanates, alkali metal halides, benzyl alcohol, water-softening agents, thickening agents, etc. The pH of the color developing solution is usually 7 or above, most generally from about 9 to about 13.

The method of the present invention is applicable to color reversal processing. In the present invention, as a black-and-white first developing solution to be used in such processing, a black-and-white developing solution used for reversal processing of color light-sensitive materials or used for processing black-and-white photographic light-sensitive materials can be used. In addition, various well known additives generally added to a black-and-white first developing solution can be incorporated in the solution.

Typical additives include developing agents such as 1-phenyl-3-pyrazolidone, metol, and hydroquinone; preservatives such as sulfites; alkalis such as sodium hydroxide, sodium carbonate, or potassium carbonate; inorganic or organic inhibitors such as potassium bromide, 2-methylbenzimidazole, methylbenzothiazole, etc.; water-softening agents such as polyphosphoric acid salts; and slight amounts of development restrainers comprising an iodide or a mercapto compounds.

The processing method according to the present invention comprises a processing step such as fixing, etc. in addition to the above described color development and bleaching. After the fixing step or the bleach-fixing step, it is general to carry out processing steps such as water washing and stabilizing, etc. It is also possible to employ a simple processing method, for example, a method wherein only a water washing step or, conversely, only a stabilizing step without conducting a substantial water washing step is carried out. Known additives may be incorporated into the water for use in the water washing step, if desired. Examples of such additives include a chelating agent such as an inorganic phosphoric acid, an aminopolycarboxylic acid, an organic phosphoric acid, etc., a germicidal agent or an antifungal agent for preventing the propagation of various bacteria and algae, a hardening agent such as a magnesium salt, an aluminium salt, etc., or a surface active agent for reducing drying load or preventing drying mark, or the like. Further, the compounds as described in L.E. West, "Water Quality Criteria" in Photo. Sci. and Eng., Vol. 9, No. 6, pages 344 to 359 (1965) may be added thereto.

Further, a water washing step may be carried out using two or more tanks, if desired. Moreover, it is possible to employ a multi-stage countercurrent, water washing process (for example, using two to nine tanks) in order to cut down an amount of water for washing.

As a stabilizing solution used in a stabilizing step, a processing solution for stabilizing dye images is employed. For example, a solution having a buffering function to maintain a pH of 3 to 6, a solution containing an aldehyde (for example, formalin, etc.), etc. can be employed. In the stabilizing solution, a brightening agent, a chelating agent, a germicidal agent, an antifungal agent, a hardening agent, a surface active agent, etc. may be used, if desired.

Further, a stabilizing step may be carried out using two or more tanks, if desired. Moreover, it is possible to employ a multi-stage countercurrent stabilizing process (for example, using two to nine tanks) in order to cut down an amount of the stabilizing solution and eliminate a water washing step.

Color light-sensitive materials processed according to the present invention in the presence of the compounds according to the present invention are known color light-sensitive materials. The present invention is particularly advantageous for processing coupler-containing multilayer negative color light-sensitive materials or color print light-sensitive materials or for processing color light-sensitive materials designed to be subjected to reversal color processing. In addition, color X-ray photographic light-sensitive materials, monolayer special color light-sensitive materials, color light-sensitive materials containing a black-and-white developing agent such as a 3-pyrazolidone as described in U.S. Pats. Nos. 2,751,297 and 3,902,905 and Japanese Patent Application (OPI) Nos. 64339/81, 85748/81 and 85749/81, and color light-sensitive materials containing a color developing agent precursor as described in U.S. Pats. Nos. 2,478,400, 3,342,597, 3,342,599, 3,719,492 and 4,214,047 and Japanese Patent Application (OPI) No. 135628/78 can be processed according to the present invention. Further, the processing may be conducted with a coupler in the developing solution.

In a photographic emulsion layer of a color light-sensitive material used in the present invention, any of silver bromide, silver iodobromide, silver iodochlorobromide, silver chlorobromide, and silver chloride may be used as a silver halide.

During formation or physical ripening of the silver halide grains, cadmium salts, zinc salts, lead salts, thallium salts, iridium salts or complex salts thereof, rhodium salts or complex salts thereof, iron salts or complex salts thereof, etc., may be present.

In the present invention, both negative emulsions forming surface latent images and direct reversal emulsions can be used. Examples of the latter emulsions include emulsions forming internal latent images and previously fogged direct reversal emulsions.

The silver halide emulsions used are preferably chemically sensitized. That is, sulfur sensitization using sulfur-containing compounds capable of reacting with silver ions or active gelatin, reduction sensitization using a reductive substance, and noble metal sensitization using compounds of noble metals such as gold can be employed alone or in combination. Examples of useful sulfur sensitizers include thiosulfates, thioureas, thiazoles, rhodanines, and other compounds. Examples of useful reduction sensitizers include stannous salts, amines, hydrazine derivatives, formamidinesulfinic acids and silane compounds. For noble metal sensitization, complexes of group VIII metals in the Periodic Table such as platinum, iridium, palladium, etc., can be used as well as gold complexes.

The photographic emulsions may be spectrally sensitized with methine dyes or the like. Dyes used include cyanine dyes, merocyanine dyes, complex cyanine dyes, complex merocyanine dyes, holopolar cyanine dyes, hemicyanine dyes, styryl dyes and hemioxonol dyes. Particularly useful dyes are those belonging to cyanine dyes, merocyanine dyes and complex merocyanine dyes.

The color light-sensitive material according to the present invention may contain a polyalkylene oxide or its ether, ester or amine derivatives thereof, a thioether compound, a thiomorpholine, a quaternary ammonium salt compound, a urethane derivative, a urea derivative, an imidazole derivative, a 3-pyrazolidone, etc., for the purpose of increasing sensitivity or contrast or for accelerating development.

As binders for photographic emulsion layers or other layers, gelatin is advantageously employed, but other hydrophilic colloids may also be used.

Various compounds may be incorporated in the color light-sensitive material according to the present invention as antifoggants or stabilizers. That is, many compounds known as antifoggants or stabilizers such as azoles (e.g., benzothiazolium salts, nitroindazoles, triazoles, benzotriazoles, benzimidazoles (particularly, nitro- or halogen-substituted derivatives), etc.); heterocyclic mercapto compounds (e.g., mercaptothiazoles, mercaptobenzothiazoles, mercaptobenzimidazoles, mercaptothiadiazoles, mercaptotetrazoles (e.g., 1-phenyl-5-mercaptotetrazole), and mercaptopyrimidines); the above described heterocyclic mercapto compounds having a water-soluble group such as a carboxyl group or a sulfo group; thioketo compounds (e.g., oxazolinethione); azaindenes (e.g., tetraazaindenes (particularly 4-hydroxy-substituted (1,3,3a, 7)tetraazaindenes)); benzenthiosulfonic acids; benzenesulfinic acids; etc., can be added.

The color light-sensitive material according to the present invention may contain an organic or inorganic hardener in its photographic emulsion layers or other layers. For example, chromium salts, aldehydes, active vinyl compounds (e.g., 1,3,5-triacryloyl-hexahydro-s-triazine, 1,3-vinylsulfonyl-2-propanol, etc.), active halogen compounds (e.g., 2,4-dichloro-6-hydroxy-s-triazine, etc.), mucohalogenic acids, etc., can be used alone or in combination.

The color light-sensitive material according to the present invention may contain in its photographic emulsion layers or other layers various surface active agents for various purposes such as improvement of coating properties, antistatic properties, slipping properties, emulsion dispersibility, anti-adhesion properties, and photographic properties (for example, development acceleration, increase in contrast, sensitization, etc.).

The color light-sensitive material according to the present invention contains in its photographic emulsion layers color forming couplers, that is, compounds capable of forming color by oxidative coupling with an aromatic primary amine developing agent (for example, a phenylenediamine derivative or an aminophenol derivative) in color development processing. For example, magenta couplers include 5-pyrazolone couplers, pyrazolobenzimidazole couplers, cyanoacetylcoumarone couplers, open chain acylacetonitrile couplers, etc., yellow couplers include acylacetamide couplers (e.g., benzoylacetanilides, pivaloylacetanilides, etc.), and cyan couplers include naphthol couplers, phenol couplers, etc. Further, couplers, for example, those as described in U.S. Pats. No. 4,124,396, 4,327,173, 4,333,999 and 4,334,011, Japanese Patent Application (OPI) Nos. 155538/82, 204545/82, 105229/83, 31953/84, 31954/84 and 34536/84, etc. can be used. Of these couplers, nondiffusible couplers having a hydrophobic group called a ballast group in their molecules are desirable. The coupler may be of either 4-equivalent type or 2-equivalent type to silver ions. Colored couplers having a color correcting effect or couplers capable of releasing a development inhibitor upon development (so-called DIR couplers) may also be used. In addition to DIR couplers, non-color forming DIR coupling compounds capable of forming a colorless coupling reaction product and releasing a development inhibitor and DIR redox compounds may also be incorporated.

The color light-sensitive material according to the present invention can contain a developing agent, including those described in *Research Disclosure*, Vol. 176, page 29 under the item of "Developing agents".

The color light-sensitive material prepared according to the present invention may contain a dye in its photographic emulsion layers or other constituting layers as a filter dye or for various purposes such as prevention of irradiation. Examples of such dye include those described in *Research Disclosure*, Vol. 176, pages 25 and 26 under the item of "Absorbing and filter dyes".

The color light-sensitive material according to the present invention can further contain antistatic agents, plasticizers, matting agents, lubricants, ultraviolet ray absorbing agents, brightening agents, air fog preventing agents, etc.

Silver halide emulsion layers and/or other constituting layers are coated on a support by a procedure such as described in *Research Disclosure*, Vol. 176, pages 27 and 28, under the item of "Coating procedures".

Since the compounds according to the present invention have the extremely high bleach accelerating effect, it is possible to attain sufficient desilveration in a short processing time even when a bleaching agent with weak bleaching ability is used. Also, the compounds according to the present invention do not adversely affect photographic properties such as color formation, sensitivity and stain properties. Further, the compounds according to the present invention can stably exist in a processing bath for such a long time that problems with control of the bath can be decreased.

The present invention will now be described in more detail with reference to the following examples, however, the present invention is not to be construed as being limited thereto.

EXAMPLE 1

On a triacetyl cellulose support provided with a subbing layer were coated in order the emulsion layers and subsidiary layers as described below to prepare a color reversal film.

First Layer: Low Speed Red-Sensitive Emulsion Layer 100 g of a cyan coupler, i.e., 2-(heptafluorobutyramido)-5-[2'-(2",4"-di-tert-amylphenoxy)-butyramido]phenol was dissolved in 100 ml of tricresyl phosphate and 100 ml of ethyl acetate and stirred at a high speed together with 1 kg of a 10% aqueous gelatin solution to prepare an emulsion. Then, 500 g of the emulsion thus obtained was mixed with 1 kg of a low speed red-sensitive silver iodobromide emulsion (containing 70 g of silver and 60 g of gelatin, and having an iodide content of 3 mol %), and the resulting mixture was then coated at a dry layer thickness of 2 μ(silver amount: 0.5 g/m$^2$).

Second Layer: High Speed Red-Sensitive Emulsion Layer 100 g of a cyan coupler, i.e., 2-(heptafluorobutyramido)-5-[2'-(2",4"-di-tert-amylphenoxy)-butyramido]phenol was dissolved in 100 ml of tricresyl phosphate and 100 ml of ethyl acetate and stirred at a high speed together with 1 kg of 10% aqueous solution to prepare an emulsion. Then, 1,000 g of the emulsion thus obtained was mixed with 1 kg of a high speed red-sensitive silver iodobromide emulsion (containing 70 g of silver and 60 g of gelatin, and having an iodide content of 3 mol %), and the resulting mixture was then coated at a dry layer thickness of 2 μ (silver amount: 0.8 g/m$^2$).

Third Layer: Intermediate Layer 2,5-Di-tert-octylhydroquinone was dissolved in 100 ml of dibutyl phthalate and 100 ml of ethyl acetate and stirred at a high speed together with 1 kg of a 10% aqueous gelatin solution to prepare an emulsion. Then, 1 kg of the emulsion thus obtained was mixed with 1 kg of a 10% aqueous gelatin solution, and the resulting mixture was coated at a dry layer thickness of 1 μ.

Fourth Layer: Low Speed Green-Sensitive Emulsion Layer

An emulsion was prepared in the same manner as described in the preparation of the emulsion for the first layer except that a magenta coupler, i.e., 1-(2,4,6-trichlorophenyl)-3-[3-(2,4-di-tert-amylphenoxy-acetamido)benzamido]-5-pyrazolone, was used in place of the cyan coupler. Then, 500 g of the emulsion thus obtained was mixed with 1 kg of a low speed green-sensitive silver iodobromide emulsion (containing 70 g of silver and 60 g of gelatin and having an iodine content of 2.5 mol %), and the resulting mixture was coated at a dry layer thickness of 2.0 μ (silver amount: 0.7 g/m$^2$).

Fifth Layer: High Speed Green-Sensitive Emulsion Layer

An emulsion was prepared in the same manner as described in the preparation of the emulsion for the first layer except that a magenta coupler, i.e., 1-(2,4,6-trichlorophenol)-3-[3-(2,4-di-tert-amylphenoxyacetamido)benzamido]-5-pyrazolone, was used in place of the cyan coupler. Then, 1,000 g of the emulsion thus obtained was mixed with 1 kg of a high speed green-sensitive silver iodobromide emulsion (containing 70 g of silver and 60 g of gelatin and having an iodide content of 2.5 mol %), and the resulting mixture was coated at a dry layer thickness of 2.0 μ (silver amount: 0.7 g/m$^2$).

Sixth Layer: Intermediate Layer 1 kg of the emulsion used in the preparation of the third layer was mixed with 1 kg of a 10% aqueous gelatin solution and coated at a dry layer thickness of 1 μ.

Seventh Layer: Yellow Filter Layer

An emulsion containing yellow colloidal silver was coated at a dry layer thickness of 1 μ.

Eighth Layer: Low Speed Blue-Sensitive Emulsion Layer

An emulsion was prepared in the same manner as described in the preparation of the emulsion for the first layer except that a yellow coupler, i.e., α-(pivaloyl)-α-(1-benzyl-5-ethoxy-3-hydantoinyl)-2-chloro-5-dodecyloxycarbonylacetanilide, was used in place of the cyan coupler. Then, 1,000 g of the emulsion thus obtained was mixed with 1 kg of a low speed blue-sensitive silver iodobromide emulsion (containing 70 g of silver and 60 g of gelatin and having an iodine content of 2.5 mol %) and the resulting mixture was coated at a dry layer thickness of 2.0 μ (silver amount: 0.6 g/m$^2$).

Ninth Layer: High Speed Blue-Sensitive Emulsion Layer

An emulsion was prepared in the same manner as described in the preparation of the emulsion for the first layer except that a yellow coupler, i.e., α-(pivaloyl)-α-(1-benzyl-5-ethoxy-3-hydantoinyl)-2-chloro-5-dodecyloxycarbonylacetanilide, was used in place of the cyan coupler. Then, 1,000 g of the emulsion thus obtained was mixed with 1 kg of a high speed blue-sensitive silver iodobromide emulsion (containing 70 g of silver and 60 g of gelatin and having an iodine content of 2.5 mol %), and the resulting mixture was coated at a dry layer thickness of 2.0 μ (silver amount: 1.0 g/m$^2$).

Tenth Layer: Second Protective Layer 1 kg of the emulsion used in the preparation of the third layer was mixed with 1 kg of a 10% aqueous gelatin solution and coated at a dry later thickness of 2 μ.

Eleventh Layer: First Protective Layer

A 10% aqueous gelatin solution containing a fine grain emulsion which had not been chemically sensitized (grain size: 0.15 μ;silver iodobromide emulsion having an iodine content of 1.0 mol %) was coated so that the amount of silver coated was 0.3 g/m$^2$ and the dry layer thickness was 1 μ.

The color reversal film thus obtained was subjected to exposure at a proper exposure amount to light having a color temperature of 4,800° K. (adjusted using a filter) from a tungsten light source and then to development processing according to the processing steps described below using various bleaching baths containing the compounds according to the present invention.

| Processing Steps | Time (min) | Temperature |
|---|---|---|
| First Developing Bath | 6 | 38° C. |
| Washing with Water | 2 | 38° C. |
| Reversal Bath | 2 | 38° C. |

-continued

| Processing Steps | Time (min) | Temperature |
|---|---|---|
| Color Developing Bath | 6 | 38° C. |
| Washing with Water | 2 | 38° C. |
| Bleaching Bath | 5 | 38° C. |
| Fixing Bath | 4 | 38° C. |
| Washing with Water | 4 | 38° C. |
| Stabilizing Bath | 1 | Room Temperature |

The composition of each processing solution used in the above described processing was as follows.

| | |
|---|---|
| First Developing Bath | |
| Water | 700 ml |
| Sodium Tetrapolyphosphate | 2 g |
| Sodium Sulfite | 20 g |
| Hydroquinone.Monosulfonate | 30 g |
| Sodium Carbonate (monohydrate) | 30 g |
| 1-Phenyl-4-methyl-4-hydroxymethyl-3-pyrazolidone | 2 g |
| Potassium Bromide | 2.5 g |
| Potassium Thiocyanate | 1.2 g |
| Potassium Iodide (0.1% solution) | 2 ml |
| Water to make | 1,000 ml (pH 10.1) |
| Reversal Bath | |
| Water | 700 ml |
| 6 Na Salt of Nitrilo-N,N,N—tri-methylenephosphonic Acid | 3 g |
| Stannous Chloride (dihydrate) | 1 g |
| p-Aminophenol | 0.1 g |
| Sodium Hydroxide | 8 g |
| Glacial Acetic Acid | 15 ml |
| Water to make | 1,000 ml |
| Color Developing Bath | |
| Water | 700 ml |
| Sodium Tetrapolyphosphate | 2 g |
| Sodium Sulfite | 7 g |
| Sodium Tertiary Phosphate (12 hydrate) | 36 g |
| Potassium Bromide | 1 g |
| Potassium Iodide (0.1% solution) | 90 ml |
| Sodium Hydroxide | 3 g |
| Citrazinic Acid | 1.5 g |
| N—Ethyl-N—(β-methanesulfonamidoethyl)-3-methyl-4-aminoaniline Sulfate | 11 g |
| Ethylenediamine | 3 g |
| Water to make | 1,000 ml |
| Bleaching Bath | |
| Water | 800 ml |
| Sodium Ethylenediaminetetraacetate (dihydrate) | 2.0 g |
| Iron (III) Ammonium Ethylenediamine-tetraacetate (dihydrate) | 120.0 g |
| Potassium Bromide | 100.0 g |
| Water to make | 1,000 ml |
| Fixing Bath | |
| Water | 800 ml |
| Ammonium Thiosulfate | 80.0 g |
| Sodium Sulfite | 5.0 g |
| Sodium Bisulfite | 5.0 g |
| Water to make | 1,000 ml |
| Stabilizing Bath | |
| Water | 800 ml |
| Formalin (37%) | 5.0 ml |
| Fuji Driwel (product of Fuji Photo Film Co., Ltd.) | 5.0 ml |
| Water to make | 1,000 ml |

The silver amount remaining in the maximum density portion of each film sample having been subjected to the development processing as described above was measured according to X-ray fluorometric analysis. The results thus obtained are shown in Table 1 below.

Further, in order to evaluate the stability of the bleach accelerating agents in the bleaching solutions, each bleaching solution containing the bleach accelerating agent as shown in Table 1 below was preserved at 40° C. in a polyethylene bottle for 4 weeks. The same development processing as described above was conducted except for using each bleaching solution thus preserved and the silver amount remaining in the maximum density portion of each sample was measured. The results thus obtained are also shown in Table 1 below.

TABLE 1

| | | | Amount of Remaining Silver | |
|---|---|---|---|---|
| Sample | Bleach Accelerating Agent | Amount Added to Bleaching Bath | Before Preservation ($\mu g/cm^2$) | After Preservation (40°C., 4 weeks) ($\mu g/cm^2$) |
| 1 | Not added | — | 15.7 | 15.9 |
| 2 | Compound (1) | $5 \times 10^{-3}$ mol/l | 4.7 | 4.9 |
| 3 | Compound (3) | $5 \times 10^{-3}$ mol/l | 4.5 | 4.6 |
| 4 | Compound (6) | $5 \times 10^{-3}$ mol/l | 4.8 | 4.9 |
| 5 | Compound (10) | $5 \times 10^{-3}$ mol/l | 5.3 | 5.4 |
| 6 | Compound (11) | $5 \times 10^{-3}$ mol/l | 5.6 | 5.6 |
| 7 | Compound (13) | $5 \times 10^{-3}$ mol/l | 5.1 | 5.1 |
| 8 | Compound (15) | $5 \times 10^{-3}$ mol/l | 3.0 | 3.0 |
| 9 | Compound (16) | $5 \times 10^{-3}$ mol/l | 3.5 | 3.6 |
| 10 | Compound (17) | $5 \times 10^{-3}$ mol/l | 3.8 | 3.8 |
| 11 | Compound (18) | $5 \times 10^{-3}$ mol/l | 3.3 | 3.3 |
| 12 | Compound A | $5 \times 10^{-3}$ mol/l | 12.6 | 15.5 |
| 13 | Compound B | $5 \times 10^{-3}$ mol/l | 12.2 | 15.6 |
| 14 | Compound C | $5 \times 10^{-3}$ mol/l | 13.3 | 15.6 |

Compounds A, B and C used for comparison are as follows:

Compound A

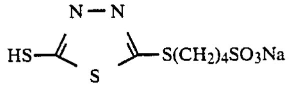

Compound B

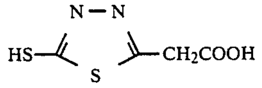

These compounds are described in Japanese Patent Application (OPI) No. 28426/78.

Compound C

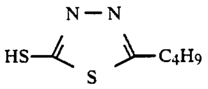

This compound is described in Japanese Patent Application (OPI) No. 52534/79.

As is apparent from the results shown in Table 1 above, the bleaching solutions containing the compound according to the present invention have an extremely large bleach accelerating function in comparison with the bleaching solution containing each of the known Compounds A, B and C. Also, the excellent bleach accelerating function does not change even after the thermal preservation at 40° C. for 4 weeks. From these facts it is understood that the bleach accelerating agents according to the present invention are extremely stable in the bleaching bath.

On the contrary, when the bleaching baths containing each of the known Compounds A, B and C were thermally preserved at 40° C. For 4 weeks, the bleach accelerating function was completely lost which indicates that these known bleach accelerating agents only have very poor stability in the bleaching bath.

From these results it can be understood that the compounds according to the present invention not only are extremely stable in the bleaching bath but also have an excellent bleach accelerating function. The compounds according to the present invention realized rapid bleaching processing, causing less environmental pollution without any adverse influence on the photographic properties.

EXAMPLE 2

The same reversal processing as described in Example 1 was conducted except for providing a bleach-fixing solution having the formulation described below in place of both the bleaching solution and the fixing solution, and adding the compound according to the present invention to the bleach-fixing solution (bleach-time: 6 minutes) as shown in Table 2 below. The amount of silver remaining in the film samples was determined in the same manner as described in Example 1. The results thus obtained are shown in Table 2 below.

| Bleach-Fixing Bath | |
|---|---|
| Iron (III) Ammonium Ethylenediamine tetraacetate Dihydrate | 120.0 g |
| Disodium Ethylenediaminetetraacetate | 5.0 g |
| Ammonium Thiosulfate Aqueous Solution (70%) | 170.0 ml |
| Sodium Sulfite | 10.0 g |
| Water to make | 1,000 ml (pH 6.5) |

Further, in each bleach-fixing bath containing the bleach accelerating agent as shown in Table 2 below was dissolved silver bromide in an amount of 16 g/l of the bath and the formation of precipitate was observed with the naked eye. The results thus obtained are also shown in Table 2 below.

TABLE 2

| Sample | Bleach Accelerating Agent | Amount Added to Bleach-Fixing Bath | Amount of Remaining Silver ($\mu g/cm^2$) | Formation of Precipitate |
|---|---|---|---|---|
| 15 | Not added | — | 110 | Not observed |
| 16 | Compound (7) | $1 \times 10^{-2}$ mol/l | 8.5 | Not observed |
| 17 | Compound (15) | $1 \times 10^{-2}$ mol/l | 4.1 | Not observed |
| 18 | Compound (16) | $1 \times 10^{-2}$ mol/l | 4.5 | Not observed |
| 19 | Compound (17) | $1 \times 10^{-2}$ mol/l | 6.2 | Not observed |
| 20 | Compound (18) | $1 \times 10^{-2}$ mol/l | 4.7 | Not observed |
| 21 | Compound (19) | $1 \times 10^{-2}$ mol/l | 9.9 | Not observed |
| 22 | Compound | $1 \times 10^{-2}$ mol/l | 100 | Observed |

TABLE 2-continued

| Sample | Bleach Accelerating Agent | Amount Added to Bleach-Fixing Bath | Amount of Remaining Silver ($\mu g/cm^2$) | Formation of Precipitate |
|---|---|---|---|---|
| | C | | | |
| 23 | Compound D | $1 \times 10^{-2}$ mol/l | 92 | Observed |

Compound C used for comparison was the same compound used in Example 1 and Compound D used for comparison is as follows:

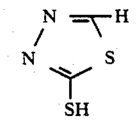

Compound D

This compound is described in British Pat. No. 1,138,842.

As is apparent from the results shown in Table 2 above, the desilveration is also remarkably accelerated when the compound according to the present invention is added to the bleach-fixing bath, and the precipitate was not formed in the bleach-fixing bath when silver ions were present therein. On the contrary, the known Compounds C and D exhibit substantially no bleach accelerating effect and they form precipitates in the bleach-fixing bath when silver ions are present therein.

From these results it can be understood that the compounds according to the present invention have excellent properties in that they have extremely large desilveration accelerating function and in that they do not form the precipitate with silver ions when they are added to the bleach-fixing bath.

EXAMPLE 3

The same reversal processing as described in Example 2 was conducted except for providing a conditioning bath having the formation described below in place of the washing with water before the bleach-fixing bath, and adding the compound according to the present invention to the conditioning bath as shown in Table 3 below. The amount of silver remaining in the film samples was determined in the same manner as described in Example 1. The results thus obtained are shown in Table 3 below.

| Conditioning Bath | |
|---|---|
| Water | 700 ml |
| Sodium Ethylenediaminetetraacetate (dihydrate) | 8 g |
| Sodium Sulfite | 12 g |
| Glacial Acetic Acid | 3 ml |
| Water to make | 1,000 ml |

TABLE 3

| Sample | Bleaching Accelerating Agent | Amount Added to Conditioning Bath (mol/l) | Amount of Remaining Silver ($\mu g/cm^2$) |
|---|---|---|---|
| 24 | Not added | — | 105 |

TABLE 3-continued

| Sample | Bleaching Accelerating Agent | Amount Added to Conditioning Bath (mol/l) | Amount of Remaining Silver ($\mu g/cm^2$) |
|---|---|---|---|
| 25 | Compound (3) | $1 \times 10^{-2}$ | 8.0 |
| 26 | Compound (5) | $1 \times 10^{-2}$ | 8.2 |
| 27 | Compound (11) | $1 \times 10^{-2}$ | 10.0 |
| 28 | Compound (13) | $1 \times 10^{-2}$ | 7.5 |
| 29 | Compound (15) | $1 \times 10^{-2}$ | 4.4 |
| 30 | Compound (17) | $1 \times 10^{-2}$ | 4.6 |
| 31 | Compound (18) | $1 \times 10^{-2}$ | 4.9 |
| 32 | Compound D | $1 \times 10^{-2}$ | 93 |

Compound D used for comparison was the same compound as used in Example 2.

As is apparent from the results shown in Table 3 above, the desilveration was remarkably accelerated by the addition of the compound according to the present invention to the conditioning bath (i.e., a prebath of the bleach-fixing bath). On the contrary, the known Compound D exhibited substantially no silver removal accelerating effect.

EXAMPLE 4

On a triacetyl cellulose support were coated layers having the compositions set forth below to prepare a multi-layer color light-sensitive material.

First Layer: Antihalation Layer

A gelatin layer containing black colloidal silver.

Second Layer: Intermediate Layer

A gelatin layer containing a dispersion of 2,5-di-tert-octylhydroquinone.

Third Layer: Low Speed Red-Sensitive Emulsion Layer

A silver iodobromide emulsion (iodide content: 5 mol %), silver coated amount: 1.6 $g/m^2$ Sensitizing Dye I: $6\times10^{-5}$ mol per mol of silver
Sensitizing Dye II: $1.5\times10^{-5}$ mol per mol of silver
Coupler EX-1: 0.04 mol per mol of silver
Coupler EX-5: 0.003 mol per mol of silver
Coupler EX-6: 0.0006 mol per mol of silver Fourth Layer: High Speed Red-Sensitive Emulsion Layer A silver iodobromide emulsion (iodide content: 10 mol %), silver coated amount: 1.4 $g/m^2$ Sensitizing Dye I: $3\times10^{-5}$ mol per mol of silver
Sensitizing Dye II: $1.2\times10^{-5}$ mol per mol of silver
Coupler EX-2: 0.02 mol per mol of silver
Coupler EX-5: 0.0016 mol per mol of silver Fifth Layer: Intermediate Layer Same as the second layer.

Sixth Layer: Low Speed Green-Sensitive Emulsion Layer

A monodispersed silver iodobromide emulsion (iodide content: 4 mol %), silver coated amount: 1.2 $g/m^2$.

Sensitizing Dye III: $3\times10^{-5}$ mol per mol of silver
Sensitizing Dye IV: $1\times10^{-5}$ mol per mol of silver
Coupler EX-4: 0.05 mol per mol of silver
Coupler EX-8: 0.008 mol per mol of silver
Coupler EX-6: 0.0015 mol per mol of silver Seventh Layer: High Speed Green-Sensitive Emulsion Layer A silver iodobromide emulsion (iodide content: 10 mol %), silver coated amount: 1.3 $g/m^2$.

Sensitizing Dye III: $2.5\times10^{-5}$ mol per mol of silver
Sensitizing Dye IV: $0.8\times10^{-5}$ mol per mol of silver
Coupler EX-3: 0.017 mol per mol of silver Coupler EX-8: 0.003 mol per mol of silver Coupler EX-10: 0.003 mol per mol of silver Eighth Layer: Yellow Filter Layer A gelatin layer containing yellow colloidal silver and a dispersion of 2,5-di-tert-octylhydroquinone.

Ninth Layer: Low Speed Blue-Sensitive Emulsion Layer

A silver iodobromide emulsion (iodide content: 6 mol %), silver coated amount: 0.7 $g/m^2$.

Coupler EX-9: 0.25 mol per mol of silver
Coupler EX-6: 0.015 mol per mol of silver Tenth Layer: High Speed Blue-Sensitive Emulsion Layer A silver iodobromide emulsion (iodide content: 6 mol %), silver coated amount: 0.6 $g/m^2$ Coupler EX-9: 0.06 mol per mol of silver Eleventh Layer: First Protective Layer A gelatin layer containing silver iodobromide (iodide content: 1 mol %, average particle size: 0.07 $\mu$), silver coated amount: 0.5 $g/m^2$ and a dispersion of Ultraviolet Ray Absorbing Agent UV-1.

Twelfth Layer: Second Protective Layer

A gelatin layer containing polymethyl methacrylate particles (having a diameter of about 1.5 $\mu$).

Gelatin Hardener H-1 and a surface active agent were incorporated into each of the layers in addition to the above described components.

The compounds used for preparing the sample were as follows:

Sensitizing Dye I: Pyridinium salt of anhydro-5,5'-dichloro-3,3'-di(γ-sulfopropyl)-9-ethylthiacarbocyanine hydroxide Sensitizing Dye II: Triethylamine salt of anhydro-9-ethyl-3,3'-di(γ-sulfopropyl)-4,5,4',5'-dibenzothiacarbocyanine hydroxide Sensitizing Dye III: Sodium salt of anhydro-9-ethyl-5,5'-dichloro-3,3'-di(γ-sulfopropyl)oxacarbocyanine Sensitizing Dye IV: Sodium salt of anhydro-5,6,5',6'-tetrachloro-1,1'-diethyl-3,3'-di{β-[β-(γ-sulfopropyl-)ethoxy]-ethyl}imidazolocarbocyanine hydroxide Couplers

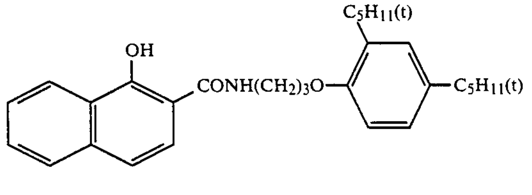
EX-1

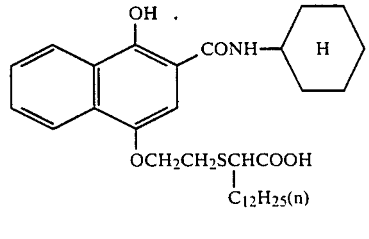
EX-2

-continued
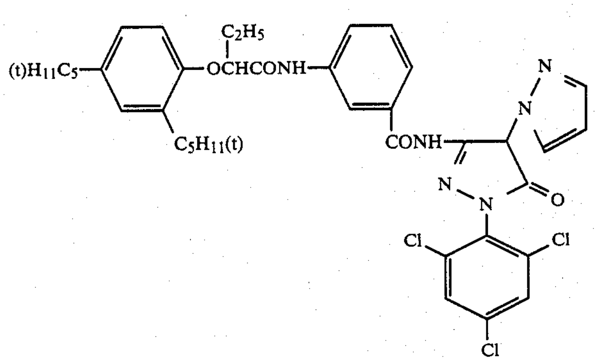
EX-3
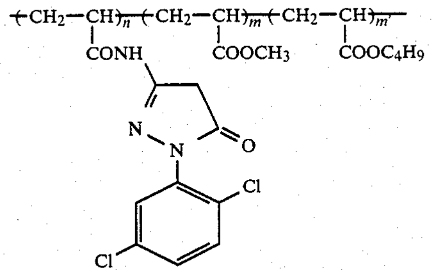
EX-4
n/m + m' = 1, m/m' = 1
(ratio by weight)
molecular weight:
about 40,000
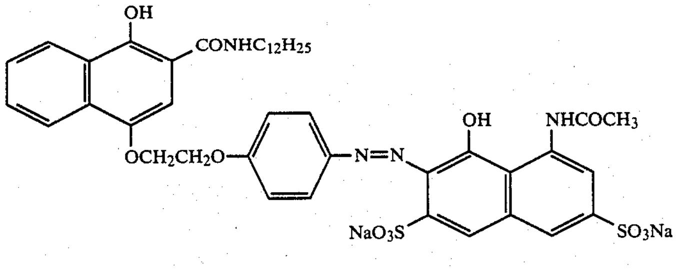
EX-5
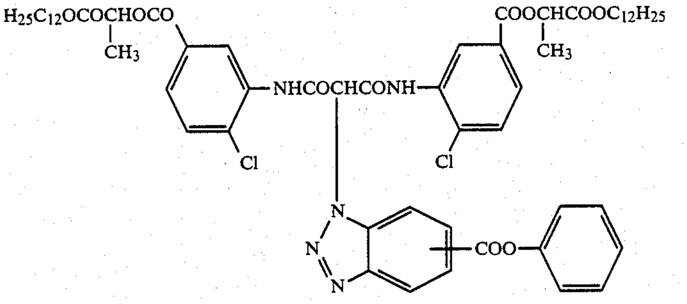
EX-6
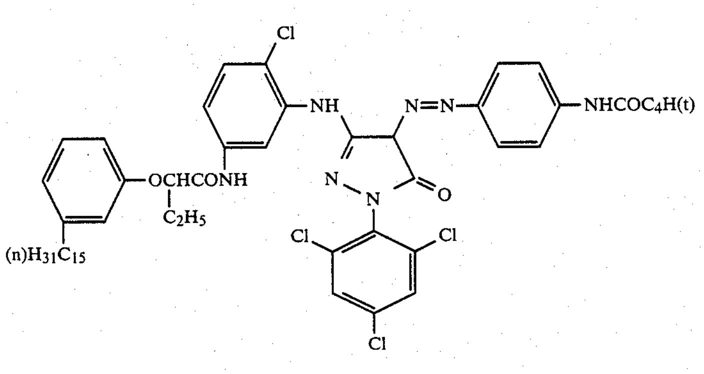
(EX-8)
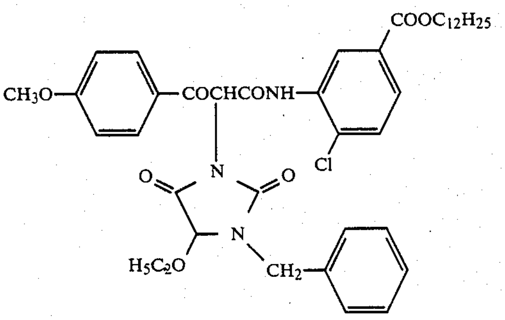
EX-9
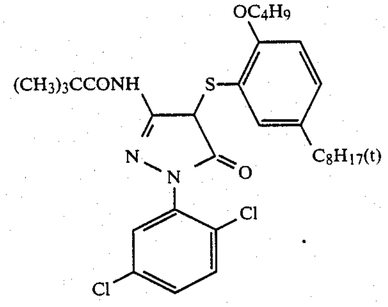
EX-10

Gelatin Hardener H-1

$CH_2{=}CH{-}SO_2{-}CH_2{-}CONH{-}CH_2{-}CH_2{-}NHCO{-}CH_2{-}SO_2{-}CH{=}CH_2$

Ultraviolet Ray Absorbing Agent UV-1

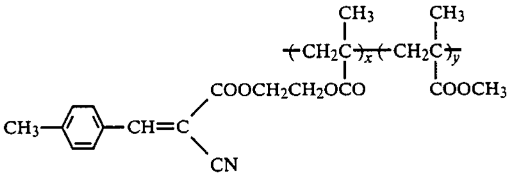

x/y = 7/3 (ratio by weight)

The resulting light-sensitive material was subjected to exposure to light in an exposure amount of 25 mcs using a tungsten light source and a filter to adjust the color temperature to 4,800° K. and then to development processing at 38° C. according to the following processing step.

| Processing Steps | Time |
|---|---|
| Color Development | 3 min & 15 sec |
| Bleaching | 2 min & 10 sec |
| Fixing | 4 min & 20 sec |
| Washing with Water | 3 min & 15 sec |
| Stabilizing | 30 sec |

The composition of each processing solution used in the above described processing was as follows.

| | |
|---|---|
| Color Developing Solution | |
| Trisodium Nitrilotriacetate | 1.9 g |
| Sodium Sulfite | 4.0 g |
| Potassium Carbonate | 30.0 g |
| Potassium Bromide | 1.4 g |
| Potassium Iodide | 1.3 mg |
| Hydroxylamine Sulfate | 2.4 g |
| 4-(N—Ethyl-N—β-hydroxyethylamino)-2-methylaniline Sulfate | 4.5 g |
| Water to make | 1.0 l (pH 10.0) |
| Bleaching Solution | |
| Iron (III) Ammonium Ethylenediamine-tetraacetate | 80.0 g |
| Disodium Ethylenediaminetetraacetate | 8.0 g |
| Ammonium Bromide | 120.0 g |
| Compound According to the Present Invention (shown in Table 4) | Amount shown in Table 4 |
| Water to make | 1.0 l (pH 6.0) |
| Fixing Solution | |
| Sodium Tetrapolyphosphate | 2.0 g |
| Sodium Sulfite | 4.0 g |
| Ammonium Thiosulfate Aqueous Solution (70%) | 175.0 ml |
| Sodium Bisulfite | 4.6 g |
| Water to make | 1.0 l (pH 6.6) |
| Stabilizing Solution | |
| Formalin (40%) | 8.0 ml |
| Water to make | 1.0 l |

The above described development processing was also conducted as above using the same bleaching bath as described above but not containing the compound according to the present invention.

Each film sample having been subjected to development processing in the above described manner was subjected to X-ray fluorometric analysis to determine the silver amount remaining in the maximum density portion of the sample. The results thus obtained are shown in Table 4 below.

Further, in the same manner as described in Example 1, each bleaching bath as shown in Table 4 below was subjected to the thermal preservation at 40° C. in a polyethylene bottle for 4 weeks, the same development processing as described above was conducted except for using each bleaching bath thus preserved and the silver amount remaining in the maximum density portion of each sample was measured. The results thus obtained are also shown in Table 4 below.

TABLE 1

| Sample | Bleach Accelerating Agent | Amount Added to Bleaching Bath | Amount of Remaining Silver: Before Preservation (μg/cm²) | After Preservation (40°C., 4 weeks) (μg/cm²) |
|---|---|---|---|---|
| 33 | Not added | — | 15.0 | 15.6 |
| 34 | Compound (1) | $5 \times 10^{-3}$ mol/l | 4.5 | 4.7 |
| 35 | Compound (3) | $5 \times 10^{-3}$ mol/l | 4.2 | 4.2 |
| 36 | Compound (6) | $5 \times 10^{-3}$ mol/l | 4.6 | 4.6 |
| 37 | Compound (10) | $5 \times 10^{-3}$ mol/l | 5.0 | 5.1 |
| 38 | Compound (11) | $5 \times 10^{-3}$ mol/l | 5.3 | 5.4 |
| 39 | Compound (13) | $5 \times 10^{-3}$ mol/l | 5.0 | 5.1 |
| 40 | Compound (15) | $5 \times 10^{-3}$ mol/l | 2.6 | 2.6 |
| 41 | Compound (16) | $5 \times 10^{-3}$ mol/l | 3.3 | 3.4 |
| 42 | Compound (17) | $5 \times 10^{-3}$ mol/l | 3.4 | 3.4 |
| 43 | Compound (18) | $5 \times 10^{-3}$ mol/l | 2.8 | 2.9 |
| 44 | Compound A | $5 \times 10^{-3}$ mol/l | 12.1 | 15.2 |
| 45 | Compound B | $5 \times 10^{-3}$ mol/l | 12.2 | 15.4 |
| 46 | Compound C | $5 \times 10^{-3}$ mol/l | 13.0 | 15.4 |

Compounds A, B and C used for comparison are the same compounds as used in Example 1.

As is apparent from the results shown in Table 4 above, the compounds according to the present invention also remarkably accelerated desilveration in the processing of the color negative light-sensitive material in comparison with the known Compounds A, B and C and the compounds according to the present invention had good stability in the bleaching solution. On the contrary, the known Compounds A, B and C were poor in the stability in the bleaching solution and had substantially no desilveration accelerating effect.

EXAMPLE 5

The same processing as described in Example 4 was conducted except for providing a bleach-fixing bath having the same formulation as described in Example 2 in place of the bleaching bath and the fixing bath, and adding the compound according to the present invention (shown in Table 5 below) to the bleach-fixing solution (bleach-fixing time was 4 minutes). The silver amount remaining in the film samples was determined in the same manner as described in Example 4. The results thus obtained are shown in Table 5 below.

TABLE 5

| Sample | Bleach Accelerating Agent | Amount Added to Bleach-Fixing Bath (mol/l) | Amount of Remaining Silver ($\mu g/cm^2$) |
|---|---|---|---|
| 47 | Not added | — | 63 |
| 48 | Compound (3) | $1 \times 10^{-2}$ | 6.0 |
| 49 | Compound (8) | $1 \times 10^{-2}$ | 6.5 |
| 50 | Compound (12) | $1 \times 10^{-2}$ | 8.9 |
| 51 | Compound (14) | $1 \times 10^{-2}$ | 8.3 |
| 52 | Compound (15) | $1 \times 10^{-2}$ | 3.8 |
| 53 | Compound (16) | $1 \times 10^{-2}$ | 3.9 |
| 54 | Compound (17) | $1 \times 10^{-2}$ | 4.2 |
| 55 | Compound (18) | $1 \times 10^{-2}$ | 4.5 |
| 56 | Compound (22) | $1 \times 10^{-2}$ | 6.6 |
| 57 | Compound A | $1 \times 10^{-2}$ | 60 |
| 58 | Compound B | $1 \times 10^{-2}$ | 61 |
| 59 | Compound D | $1 \times 10^{-2}$ | 56 |

Compounds A, B and D used for comparison are the same compounds as used in Examples 1 and 2.

As is apparent from the results shown in Table 5 above, the use of the compound according to the present invention in the bleach-fixing bath remarkably accelerated desilveration in the processing of the color negative photographic light-sensitive material in comparison with the known Compounds A, B and D.

While the invention has been described in detail and with reference to specific embodiments thereof, it will be apparent to one skilled in the art that various changes and modifications can be made therein without departing from the spirit and scope thereof.

What is claimed is:

1. A method for processing a silver halide color photographic light-sensitive material by subjecting an exposed silver halide color photographic light-sensitive material to color development, then to bleaching and fixing or then to bleach-fixing, which method comprises using a ferric ion complex salt as a bleaching agent in the bleaching or bleach-fixing and incorporating at least one compound represented by general formula (I) described below or a salt thereof:

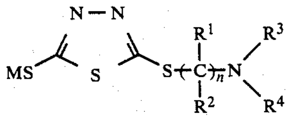
(I)

wherein $R^1$ and $R^2$ each represents a hydrogen atom, a hydroxy group, a substituted or unsubstituted amino group, a carboxy group, a sulfo group or a substituted or unsubstituted alkyl group; $R^3$ and $R^4$ each represents a hydrogen atom, a substituted or unsubstituted alkyl group or a substituted or unsubstituted acyl group or $R^3$ and $R^4$ may be bonded to each other to form a ring; M represents a hydrogen atom, an alkali metal atom or an ammonium group; and n represents an integer of 2 to 5 in a bleaching bath or bleach-fixing bath or in a prebath of the bleaching bath or bleach-fixing bath.

2. A method for processing a silver halide color photographic light-sensitive material as claimed in claim 1, wherein the substituted or unsubstituted alkyl group represented by $R^1$, $R^2$, $R^3$, or $R^4$ is an alkyl group having from 1 to 5 carbon atoms in the alkyl moiety.

3. A method for processing a silver halide color photographic light-sensitive material as claimed in claim 1, wherein a substitutent for the substituted alkyl group for $R^1$, $R^2$, $R^3$ or $R^4$ is selected from a carboxy group, a hydroxy group, a sulfo group, an amino group, an alkoxy group, a sulfonyl group, a carbamoyl group, a sulfamoyl group, an amido group, a sulfonamido group, an alkoxycarbonyl group, a carbonyloxy group, a cyano group or a halogen atom.

4. A method for processing a silver halide color photographic light-sensitive material as claimed in claim 1, wherein the acyl group represented by $R^3$ or $R^4$ is an acyl group having 3 or less carbon atoms.

5. A method for processing a silver halide color photographic light-sensitive material as claimed in claim 1, wherein the ring formed by bonding $R^3$ and $R^4$ is selected from a pyrrole ring, an imidazole ring a morpholine ring and a piperidine ring.

6. A method for processing a silver halide color photographic light-sensitive material as claimed in claim 1, wherein the substituted alkyl group represented by $R^3$ or $R^4$ is an alkyl group substituted with a carboxy group, a hydroxy group, an amino group or a sulfo group.

7. A method for processing a silver halide color photographic light-sensitive material as claimed in claim 1, wherein the compound represented by general formula (I) is incorporated into the bleaching bath.

8. A method for processing a silver halide color photographic light-sensitive material as claimed in claim 1, wherein the compound represented by general formula (I) is incorporated into the bleach-fixing bath.

9. A method for processing a silver halide color photographic light-sensitive material as claimed in claim 1, wherein the compound represented by general formula (I) is incorporated into the prebath of the bleaching bath or bleach-fixing bath.

10. A method for processing a silver halide color photographic light-sensitive material as claimed in claim 1, wherein the amount of the compound represented by general formula (I) in the bleaching bath, the bleach-fixing bath or the prebath of the bleaching bath or bleach-fixing bath is from $1 \times 10^{-5}$ to 1mol per liter of a processing solution.

11. A method for processing a silver halide color photographic light-sensitive material as claimed in claim 9, wherein the prebath is an aqueous solution containing the compound represented by general formula (I) and having a pH of 9 or less.

12. A method for processing a silver halide color photographic light-sensitive material as claimed in claim 1, wherein the chelating agent is an aminopolycarboxylic acid, an aminopolyphosphonic acid or a salt thereof.

13. A method for processing a silver halide color photographic light-sensitive material as claimed in claim 1, wherein the bleaching bath further contains a rehalogenating agent.

14. A method for processing a silver halide color photographic light-sensitive material as claimed in claim 13, wherein the amount of the ferric ion complex salt is from 0.1 to 2 mols per liter of the bleaching solution.

15. A method for processing a silver halide color photographic light-sensitive material as claimed in claim 1, wherein the multilayer color photographic light-sensitive material is a negative color photographic light-sensitive material, a color print photographic light-sensitive material or a reversal color photographic light-sensitive material.

16. A method for processing a silver halide color photographic light-sensitive material as claimed in claim 7, wherein said bleaching bath has a pH of from 3.0 to 8.0.

17. A method for processing a silver halide color photographic light-sensitive material as claimed in claim 7, wherein said bleaching bath has a pH of from 4.0 to 7.0.

18. A method for processing a silver halide color photographic light-sensitive material as claimed in claim 8, wherein said bleach-fixing bath has a pH of from 4.0 to 9.0.

19. A method for processing a silver halide color photographic light-sensitive material as claimed in claim 8, wherein said bleach-fixing bath has a pH of from 5.0 to 8.0.

* * * * *